US006299255B1

United States Patent
Pichon

(10) Patent No.: US 6,299,255 B1
(45) Date of Patent: Oct. 9, 2001

(54) AUTOMOBILE VEHICLE SEAT COVERED WITH A RETURN SLEEVE

(75) Inventor: Hugues Pichon, Morigny (FR)

(73) Assignee: Bertrand Faure Equipments SA, Boulogne (FR)

( * ) Notice: Subject to any disclaimer, the term of this patent is extended or adjusted under 35 U.S.C. 154(b) by 0 days.

(21) Appl. No.: 09/512,551

(22) Filed: Feb. 24, 2000

(30) Foreign Application Priority Data

Mar. 3, 1999 (FR) .................................................. 99 02627

(51) Int. Cl.[7] .................................................. A47C 7/02
(52) U.S. Cl. .................................... 297/452.6; 297/218.5
(58) Field of Search .......................... 297/452.59, 452.6, 297/218.1, 218.2, 218.5

(56) References Cited

U.S. PATENT DOCUMENTS

| 3,630,572 | * | 12/1971 | Homier | 297/452.6 |
| 4,317,591 | | 3/1982 | Ramsey . | |
| 4,609,226 | * | 9/1986 | Yoshizawa | 297/452.6 |
| 5,733,001 | | 3/1998 | Roberts | 297/218.1 |

FOREIGN PATENT DOCUMENTS

| 2357491 | * | 5/1974 | (DE) | 297/452.6 |
| 30 37 834 | | 10/1980 | (DE) . | |
| 0 231 692 | | 8/1987 | (EP) . | |
| 0 240 388 | | 10/1987 | (EP) . | |
| 0 280 148 | | 8/1988 | (EP) . | |
| 0 433 100 | | 9/1991 | (EP) . | |
| 2 747 545 | | 10/1997 | (FR) . | |

* cited by examiner

Primary Examiner—Peter R. Brown
(74) Attorney, Agent, or Firm—Marshall, Gerstein, & Borun

(57) ABSTRACT

The seat comprised a foam cushioning provided with a bearing face covered with an upholstery cover in which are defined connexion lines, along which a section of the sleeve is pulled into a slit provided in the cushioning by a fastening device. This device comprises an insert carried by the cushioning in correspondence with said slit and a plurality of ties the ends of which have two branches which are hooked to the insert and the edges so that the ties exert a traction on these edges.

11 Claims, 1 Drawing Sheet

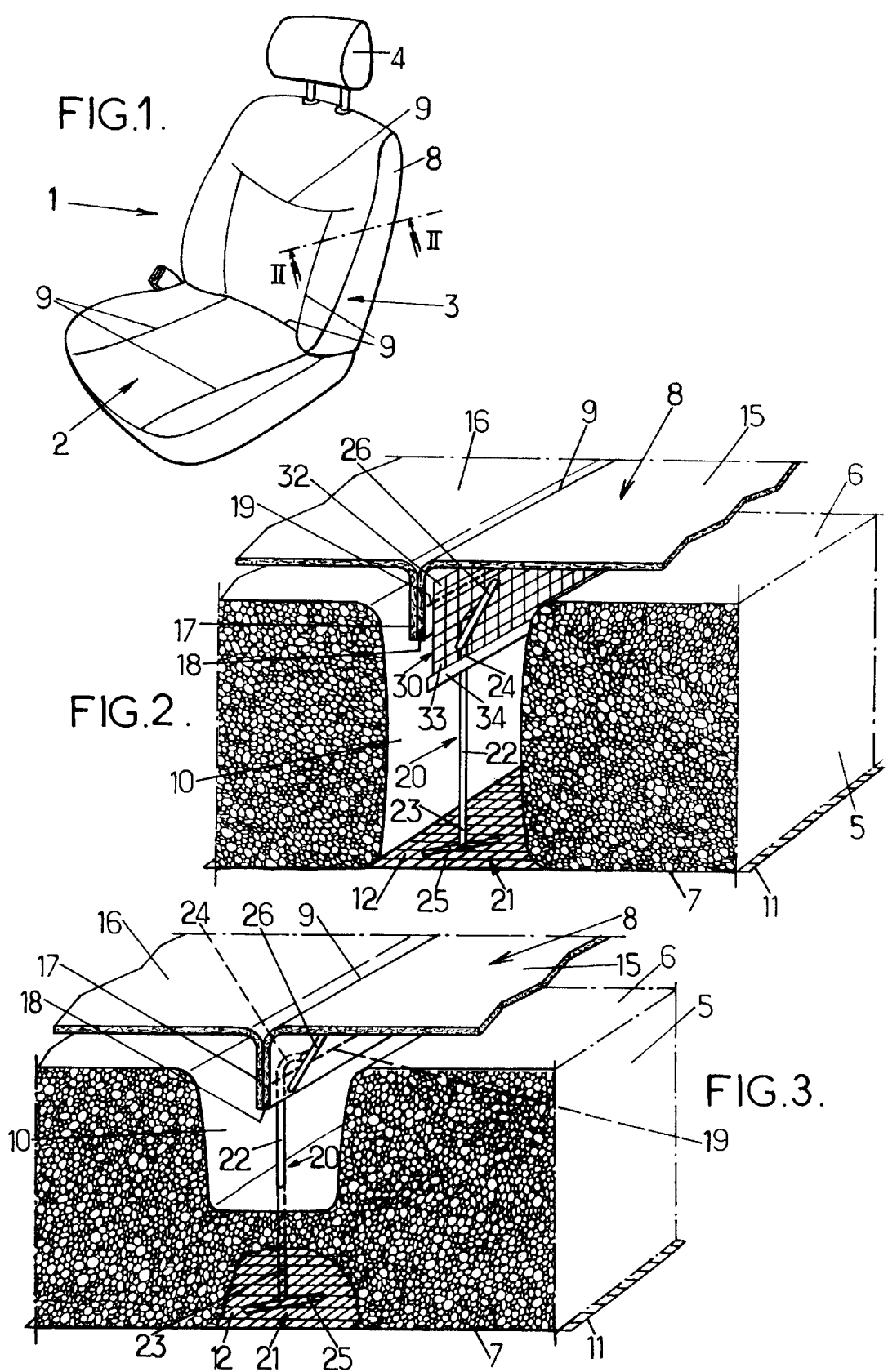

AUTOMOBILE VEHICLE SEAT COVERED WITH A RETURN SLEEVE

FIELD OF THE INVENTION

The invention relates to automobile vehicle seats which comprises a foam cushioning provided with a bearing face which is covered by an upholstery cover.

More particularly, the invention relates to an automobile seat comprising a foam cushioning provided with a bearing face which is covered by an upholstery cover, the cushioning having at least one slit which opens onto the bearing face and which extends over a certain thickness in the cushioning, the upholstery cover comprising, in correspondence with said at least one slit, at least one connexion line formed by a fixing strip which is retained in the slit by a number of ties having a thread-like form, said ties being fixed to the fixing strip and to at least one insert which is integral with the cushioning, each tie extending longitudinally between first and second ends and the second end passing through the plane insert so as to fasten onto this insert.

BACKGROUND OF THE INVENTION

The document EP-A-0 243 188 describes a seat of this type, which has the disadvantage that the different ties of each fixing strip are fixed to each other forming a single plastic material part which runs along said return line. The result is that on the one hand, this plastic material part is relatively expensive, and on the other hand, said part increases the rigidity of the sleeve and makes it relatively difficult to handle said sleeve during installation.

OBJECTS AND SUMMARY OF THE INVENTION

A particular object of the present invention is to overcome this drawback.

To this end, according to the invention:
the ties are parts distinct from each other,
the first end of each tie is integral with a first substantially rigid branch perpendicular to said tie, said first end of the tie passing through the fixing strip and the first branch bearing against said fixing strip,
the second end of each filiform tie has been materially provided with a second substantially rigid branch perpendicular to said tie, the second branch actively supporting the insert,
at least one of the first and second branches is movable between:
  on the one hand, a withdrawn position where said branch is forced into a position approximately parallel to the filiform tie,
  and, on the other hand, a normal position in which said branch is approximately perpendicular to said filiform tie.

Thus, during installation by being turned inside out over the cushioning, the cover retains its flexibility whereas the fastening device is easy to install and effectively returns the sleeve into the cushioning. Moreover, the ties according to the invention are particularly inexpensive.

In preferred embodiments, use is also made of one and/or other of the following arrangements:
the insert is embedded in the cushioning;
the cushioning has a rear face opposite the bearing face, the insert being tangent to the rear face;
the rear face of the cushioning is molded over a strengthening fabric and the insert is formed by a portion of said fabric;
the slit is open only toward said upholstery cover;
the slit opens onto the rear face of the cushioning;
the sleeve comprises at least two cloth parts each having an edge, these two edges being mutually fixed at the connexion line by a seam line and form said fixing strip;
the cover includes at least two cloth parts each having an edge, these two edges being mutually fixed at the connexion line by a seam line, these edges being integral with said fixing strip, which is formed by a sheet of flexible material which comprises a first longitudinal edge sewn with the two edges of the parts of the sleeve and a second longitudinal free edge which penetrates into the slit;
the first end of the tie passes through the fixing strip;
the tie is made of plastic material;
  each of the first and second branches forms a T with the corresponding end of the tie.

BRIEF DESCRIPTION OF THE DRAWINGS

An embodiment example of the invention, and a variant on this example, will now be described in relation to the appended drawings in which:

FIG. 1 is an overall view of an automobile vehicle seat provided with a sleeve which is fitted with the fastening device according to this invention;

FIG. 2 is a partial cross section view along line II—II of FIG. 1, showing the fastening device according to the present invention; and FIG. 3 is a variant of the fastening device of FIG. 2.

MORE DETAILED DESCRIPTION

In the different figures, the same numerical references denote identical or similar elements.

FIG. 1 shows an automobile vehicle seat 1 consisting of a seat part 2 and a back 3 which is supported by the seat part 2 and which is surmounted by a head-rest 4.

The seat part 2 and the back 3 are each fitted with a synthetic foam cushioning 5 (FIGS. 2 and 3) which has a bearing face 6 against which a vehicle passenger is intended to sit, and a rear face or lower face 7 opposite to the bearing face 6.

The rear face 7 is generally supported against a suspension web (not shown) itself stretched over a metal frame of the seat back and of the seat part.

The foam cushioning 5 is previously shaped and its bearing face 6 is covered with an upholstery cover 8. This cover is made of cloth, leather, leatherette or similar material and is configured with connexion lines 9. The seat part 2 has two approximately horizontal and rectilinear connexion lines whereas the seat back 3 has two approximately vertical and rectilinear connexion lines 9 and, for example, a third approximately horizontal and curved connexion line 9 extending in the top of the seat back, between the first two lines.

In correspondence with these connexion lines 9, the cushionings 5 of the seat part 2 and of the back 3 have slits 10.

In the example shown in FIG. 2, each of the slits 10 passes through the cushioning 5 to open both on the bearing face 6 and on the rear face 7.

In order to avoid deterioration of the rear face 7 of the cushioning 5, during movements of the passenger in the seat, the cushioning 5 is, in a way known per se, molded over a strengthening fabric 11 with the result that this fabric extends over the whole surface of the rear face 7. This strengthening fabric is for example a web made in textile which has meshes 12.

Out of a concern for clarity in FIGS. 2 and 3, the sleeve 8 is shown separate from the face 6 of the cushioning. Of course, it is understood that these elements are in reality put together.

The sleeve 8 is made by assembling several pieces of cloth. For example, two of these pieces 15 and 16 are shown in FIGS. 2 and 3. These pieces are fixed to each other along one return line 9 by sewing two of their edges 17, 18 which are tangential to each other. These edges are turned inside the cushioning 5, penetrating into the slit 10. The seam 19 which fixes them extends along the length of the slit 10.

The two edges 17,18 are returned inside the cushioning 5 along the return lines 9, by means of a fastening device 20 according to the present invention.

The fastening device 20 consists of a plane insert 21 and a tie 22 having a thread-like form.

The plane insert 21 is carried by the cushioning 5, in correspondence with the slit 10. In the example shown in FIG. 2, this insert extends in the bottom of the slit 10, being tangent to the rear face 7 of the cushioning 5. It is for example constituted by a portion of the strengthening fabric 11.

The tie 22 extends between a first end 23 and a second end 24 materially provided with two T branches 25, 26. The tie is made of plastic material. The branches 25, 26 are approximately rigid and are approximately perpendicular to the rectilinear tie 22.

On the two edges 17, 18 of the pieces of cloth 15, 16 is also sewn a fixing strip 30. This strip is approximately rectangular and is made from a textile fabric possibly coated with continuous film of synthetic material or else is made from a sheet of flexible and pliable material so as to be approximately without rigidity. This strip is sewn on the edges 17, 18 along one of these longitudinal edges 32 whereas its longitudinal second edge 33 is materially provided with a rod 34 which allows the whole to be given a rectilinear shape. As a variant, the rod 34 can be molded over with the strip along the longitudinal edge 33.

The installation of the sleeve 8 on the cushioning 5 is made by reversal of this sleeve on the cushioning and by anchoring the filiform tie 22 by means of a gun (not shown).

During this installation, the first end 23 of the tie is in a withdrawn position in which it is approximately parallel to the tie 22 so as to break through the strengthening fabric 11, at the part 21 of this fabric, by passing through a mesh 12. The first end 23 is then released to occupy a normal position in which it is perpendicular to the tie and it is supported behind the fabric 11. As for the second end 24, it is passed through the fixing strip 30, vertical to the position of the first end 23, to be supported on this strip so that the tie 22 exerts a traction on the edges 17, 18 of the parts 15, 16.

By installing a certain number of ties 22 in this way along the return lines 9, the edges 17, 18 are kept pulled into the cushioning 5.

The variant shown in FIG. 3 differs from the previously described example by the fact that the slit 10 is blind and by the absence of the fixing strip 30. The slit 10 opens only onto the bearing face 6 of the cushioning 5, forming a groove.

The second end 24 of the tie 22 is now directly installed in the edges 17, 18 of the cloth pieces 15, 16. The tie 22 extends into the slit 10 and penetrates into the cushioning 5 with the result that the first end 23 is still supported behind the filler fabric 11. The depth of the slit 10 is adapted to the dimensions of the edges 17, 18 so that the latter do not become overly thick during installation of the sleeve 8 on the cushioning 5.

Of course, it is understood that the insert 21 can be constituted for instance by a piece of woven material which is sunk in the part of the cushioning 5 extending between the bottom of the slit 10 and the rear face 7.

I claim:

1. An automobile seat comprising a foam cushioning provided with a bearing face which is covered by an upholstery cover, the cushioning having at least one slit which opens onto the bearing face and which extends over at least a certain thickness in the cushioning, the upholstery cover comprising, in correspondence with said at least one slit, at least one connection line including a fixing strip which is retained in the slit by a number of ties having a thread-like form, said ties being fixed to the fixing strip and to at least one insert which is integral with the cushioning, in correspondence with said at least one slit, each tie extending longitudinally between first and second ends and the second end passing through the insert so as to fasten onto this insert, wherein the ties are parts distinct from each other, wherein the first end of each tie is integral with a first substantially rigid branch perpendicular to said tie, said first end of the tie passing through the fixing strip and the first branch actively supporting said fixing strip, wherein the second end of each tie is integral with a second substantially rigid branch perpendicular to said tie, the second branch bearing against the insert, and wherein at least one of the first and second branches is movable between:
a withdrawn position where said branch is forced into a position approximately parallel to the tie,
and a normal position in which said branch is approximately perpendicular to said tie.

2. An automobile vehicle seat according to claim 1, wherein the insert is embedded in the cushioning.

3. An automobile vehicle seat according to claim 1, wherein the cushioning has a rear face opposite the bearing face, the insert being tangent to the rear face.

4. An automobile vehicle seat according to claim 3, wherein the rear face of the cushioning is molded over a strengthening fabric and the insert is formed by a portion of said fabric.

5. An automobile vehicle seat according to claim 1, wherein the slit is open only toward said upholstery cover.

6. An automobile vehicle seat according to claim 1, wherein the slit opens onto the rear face of the cushioning.

7. An automobile vehicle seat according to claim 1, wherein the cover includes at least two cloth parts each having an edge, these two edges being mutually fixed at the connection line by a seam line and forming said fixing strip.

8. An automobile vehicle seat according to claim 1, wherein the cover includes at least two cloth parts each having an edge, the edge of said cloth parts being mutually fixed at the connection line by a seam line, said edges of said cloth parts being integral with said fixing strip, which is formed by a sheet of flexible material which comprises a first longitudinal edge sewn with the said edges of cloth parts of the cover and a second longitudinal free edge which penetrates into the slit.

9. An automobile vehicle seat according to claim 8, wherein the first end of the tie passes through the fixing strip.

10. An automobile vehicle seat according to claim 1, wherein the tie is made of plastic material.

11. An automobile vehicle seat according to claim 1, wherein each of the first and second branches forms a T with the corresponding end of the tie.

* * * * *